United States Patent [19]

Kukes et al.

[11] Patent Number: 4,609,638

[45] Date of Patent: Sep. 2, 1986

[54] DEMETALLIZATION OF HYDROCARBON CONTAINING FEED STREAMS

[75] Inventors: Simon G. Kukes; Gil R. Hawley, both of Bartlesville, Okla.

[73] Assignee: Phillips Petroleum Company, Bartlesville, Okla.

[21] Appl. No.: 745,552

[22] Filed: Jun. 17, 1985

Related U.S. Application Data

[62] Division of Ser. No. 575,592, Jan. 31, 1984, Pat. No. 4,557,824.

[51] Int. Cl.⁴ .................... B01J 27/14; B01J 27/185
[52] U.S. Cl. ............................... 502/208; 502/213
[58] Field of Search ............................. 502/208, 213

[56] References Cited

U.S. PATENT DOCUMENTS

| | | | |
|---|---|---|---|
| 3,546,105 | 12/1970 | Joffe | 208/216 |
| 3,784,483 | 1/1974 | Cichowski | 502/213 |
| 4,396,537 | 8/1983 | Eastman | 502/213 |
| 4,400,568 | 8/1983 | Hofmann et al. | 502/208 X |
| 4,427,575 | 1/1984 | Johnson et al. | 502/208 |
| 4,427,792 | 1/1984 | Pedersen et al. | 502/210 |
| 4,430,207 | 2/1984 | Kukes | 502/208 X |
| 4,441,992 | 4/1984 | Kimble | 208/251 H |
| 4,450,068 | 5/1984 | Kukes | 502/213 X |
| 4,457,835 | 7/1984 | Kukes | 108/251 H |
| 4,473,707 | 9/1984 | Teng et al. | 502/204 X |
| 4,521,528 | 6/1985 | Kovach | 502/208 |

FOREIGN PATENT DOCUMENTS 2068252A 8/1981 United Kingdom ............... 502/213

*Primary Examiner*—Andrew H. Metz
*Assistant Examiner*—William G. Wright
*Attorney, Agent, or Firm*—French and Doescher

[57] ABSTRACT

Metals contained in a hydrocarbon containing feed stream are removed by contacting the hydrocarbon containing feed stream under suitable demetallization conditions with hydrogen and a catalyst composition comprising zirconium phosphate, cobalt phosphate and iron phosphate. The life and activity of the catalyst composition may be increased by introducing a decomposable metal compound selected from the group consisting of the metals of Group V-B, Group VI-B, Group VII-B and Group VIII of the Periodic Table into the hydrocarbon containing feed stream prior to contacting the hydrocarbon containing feed stream with the catalyst composition.

6 Claims, No Drawings

DEMETALLIZATION OF HYDROCARBON CONTAINING FEED STREAMS

This application is a division of application Ser. No. 575,592, filed Jan. 31, 1984, now U.S. Pat. No. 4,557,824.

This invention relates to a process for removing metals from a hydrocarbon containing feed stream and a catalyst therefor.

It is well known that crude oil as well as products from extraction and/or liquifaction of coal and lignite, products from tar sands, products from shale oil and similar products may contain metals such as vanadium, nickel and iron. When these hydrocarbon containing feeds are fractionated, the metals tend to concentrate in the heavier fractions such as the topped crude and residuum. The presence of the metals make further processing of these heavier fractions difficult since the metals generally act as poisons for catalysts employed in processes such as catalytic cracking, hydrogenation or hydrodesulfurization.

It is thus an object of this invention to provide a process for removing metals from a hydrocarbon containing feed stream so as to improve the processability of such hydrocarbon containing feed stream and especially improve the processability of heavier fractions such as topped crude and residuum. It is also an object of this invention to provide a catalyst composition which is useful for demetallization.

In accordance with the present invention, a hydrocarbon containing feed stream, which also contains metals, is contacted with a catalyst composition comprising zirconium phosphate, cobalt phosphate and iron phosphate in the presence of hydrogen under suitable demetallization conditions. It is believed that the metals contained in heterocyclic compounds such as porphyrins are removed from the heterocyclic compounds by the combination of heat, hydrogen and the catalyst composition of the present invention and are trapped in pores in the catalyst composition. Removal of the metals from the hydrocarbon containing feed stream in this manner provides for improved processability of the hydrocarbon containing feed stream in processes such as catalytic cracking, hydrogenation and hydrodesulfurization.

Other objects and advantages of the invention will be apparent from the foregoing brief description of the invention and the appended claims as well as the detailed description of the invention which follows.

Any metal which can be trapped in the pores of the catalyst composition of the present invention can be removed from a hydrocarbon containing feed stream in accordance with the present invention. The present invention is particularly applicable to the removal of vanadium and nickel.

Metals may be removed from any suitable hydrocarbon containing feed streams. Suitable hydrocarbon containing feed streams include petroleum products, coal pyrolyzates, products from extraction and/or liquifaction of coal and lignite, products from tar sands, products from shale oil and similar products. Suitable hydrocarbon feed streams include gas oil having a boiling range from about 205° C. to about 538° C., topped crude having a boiling range in excess of about 343° C. and residuum. However, the present invention is particularly directed to heavy feed streams such as heavy topped crudes and residuum and other materials which are generally regarded as being too heavy to be distilled. These materials will generally contain the highest concentrations of metals such as vanadium and nickel.

The demetallization catalyst employed in the process of the present invention is a composition comprising zirconium phosphate, cobalt phosphate and iron phosphate. As used herein, the term phosphate includes orthophosphates, pyrophosphates, metaphosphates and polyphosphates.

The catalyst composition can be prepared by any suitable method. Coprecipitation is preferred because it is believed that the catalyst composition is more effective when prepared by coprecipitation. The catalyst is generally prepared by coprecipitating any suitable zirconium salt, any suitable cobalt salt and any suitable iron salt with any suitable phosphate. The coprecipitation may be carried out in any suitable solvent such as water or alcohol with water being the preferred solvent. The metal salts and the phosphate must be soluble in the solvent used to be suitable.

If a phosphate such as diammonium phosphate is utilized, the pH of the solution will generally be such that precipitation will occur. However, if other phosphates are used, it may be necessary to add a base such as ammonia to achieve a pH which will result in the desired precipitation.

The precipitant formed is washed, dried and calcined in the presence of a free oxygen containing gas such as air to form the catalyst.

The drying of the precipitant may be accomplished at any suitable temperature. Generally a temperature of about 20° C. to about 200° C., preferably about 100° C. to about 150° C., is utilized for a time in the range of about 1 hr. to about 30 hrs.

The calcining step is utilized to remove traces of nitrates, traces of carbon, and water and to make the structure of the catalyst composition harder. Any suitable calcining temperature can be utilized. Generally, the calcining temperature will be in the range of about 300° C. to about 800° C. with a temperature in the range of about 450° C. to about 650° C. being preferred for a time in the range of about 1 to about 24 hours, preferably about 2 to about 6 hours.

The catalyst composition can have any suitable surface area and pore volume. In general, the surface area will be in the range of about 2 to about 400 m$^2$/g, preferably about 80 to about 150 m$^2$/g, while the pore volume will be in the range of about 0.1 to about 4.0 cc/g, preferably about 0.2 to about 1.0 cc/g.

Any suitable phosphates may be utilized to prepare the catalyst composition. Suitable phosphates include $(NH_4)H_2PO_4$, $(NH_4)_2HPO_4$, $(NH_4)_3PO_4$, $(NH_4)_4P_2O_7$, corresponding phosphates and pyrophosphates of lithium, sodium, potassium, rubidium, and cesium, and $H_3PO_4$. Phosphonic acids such as phenyl phosphonic acids and the metal salts of phosphonic acids may also be used to derive phosphates for the catalyst composition if desired.

Any suitable metal (zirconium, cobalt, iron) to phosphorus ratio in the catalyst composition may be used. The ratio will generally be about stoichiometric. Any suitable ratio of cobalt and iron to zirconium may be used. The molar ratio of zirconium to these metals will generally be in the range of about 10:1 to about 1:10 and more preferably in the range of about 3:1 to about 1:1. Any suitable iron to cobalt ratio may be used. The molar ratio of iron to cobalt will generally be in the range of about 10:1 to about 1:10 and more preferably in the range of about 2:1 to about 1:2.

The demetallization process of this invention can be carried out by means of any apparatus whereby there is achieved a contact of the catalyst composition with the hydrocarbon containing feed stream and hydrogen under suitable demetallization conditions. The process is in no way limited to the use of a particular apparatus. The process of this invention can be carried out using a fixed catalyst bed, fluidized catalyst bed or a moving catalyst bed. Presently preferred is a fixed catalyst bed.

The catalyst composition may be used alone in the reactor or may be used in combination with essentially inert materials such as alumina, silica, titania, magnesia, silicates, aluminates, alumina silicates, titanates and phosphates. A layer of the inert material and a layer of the catalyst composition may be used or the catalyst composition may be mixed with the inert material. Use of the inert material provides for better dispersion of the hydrocarbon containing feed stream. Also, other catalysts such as known hydrogenation and desulfurization catalysts may be used in the reactor to achieve simultaneous demetallization, desulfurization and hydrogenation or hydrocracking if desired.

Any suitable reaction time between the catalyst composition and the hydrocarbon containing feed stream may be utilized. In general, the reaction time will range from about 0.1 hours to about 10 hours. Preferably, the reaction time will range from about 0.4 to about 4 hours. Thus, the flow rate of the hydrocarbon containing feed stream should be such that the time required for the passage of the mixture through the reactor (residence time) will preferably be in the range of about 0.4 to about 4 hours. This generally requires a liquid hourly space velocity (LHSV) in the range of about 0.10 to about 10 cc of oil per cc of catalyst per hour, preferably from about 0.2 to about 2.5 cc/cc/hr.

The demetallization process of the present invention can be carried out at any suitable temperature. The temperature will generally be in the range of about 150° to about 550° C. and will preferably be in the range of about 350° to about 450° C. Temperatures should not be utilized which will have adverse effects on the hydrocarbon containing feed stream, such as coking, and also economic considerations must be taken into account. Lower temperatures can generally be used for lighter feeds.

Any suitable pressure may be utilized in the demetallization process. The reaction pressure will generally be in the range of about atmospheric to about 5,000 psig. Preferably, the pressure will be in the range of about 100 to about 2500 psig. Higher pressures tend to reduce coke formation but operation at high pressure may have adverse economic consequences.

Any suitable quantity of hydrogen can be added to the demetallization process. The quantity of hydrogen used to contact the hydrocarbon containing feed stock will generally be in the range of about 100 to about 10,000 standard cubic feet per barrel of the hydrocarbon containing feed stream and will more preferably be in the range of about 1000 to about 6000 standard cubic feet per barrel of the hydrocarbon containing feed stream.

In general, the catalyst composition is utilized for demetallization until a satisfactory level of metals removal fails to be achieved which is believed to result from the coating of the catalyst composition with the metals being removed. It is possible to remove the metals from the catalyst composition by certain leaching procedures but these procedures are expensive and it is generally contemplated that once the removal of metals falls below a desired level, the used catalyst will simply be replaced by a fresh catalyst.

The time in which the catalyst composition will maintain its activity for removal of metals will depend upon the metals concentration in the hydrocarbon containing feed streams being treated. It is believed that the catalyst composition may be used for a period of time long enough to accumulate 20–200 wt. % of metals, mostly Ni and V, based on the weight of the catalyst composition, from oils.

It is believed that the life of the catalyst composition and the efficiency of the demetallization process can be improved by introducing a decomposable metal compound into the hydrocarbon containing feed stream. It is believed that the metal in the decomposable metal compound could be selected from the group consisting of the metals of Group V-B, Group VI-B, Group VII-B and Group VIII of the Periodic Table. Preferred metals are molybdenum, tungsten, manganese, chromium, nickel and iron. Molybdenum is a particularly preferred metal which may be introduced as a carbonyl, acetate, acetylacetonate, octoate naphthenate, or dithiocarbamate. Molybdenum hexacarbonyl is a particularly preferred additive.

Any suitable concentration of the additive may be added to the hydrocarbon containing feed stream. In general, a sufficient quantity of the additive will be added to the hydrocarbon containing feed stream to result in a concentration of the metal in the range of about 1 to about 1000 parts per million and more preferably in the range of about 1 to about 100 parts per million.

The following examples are presented in further illustration of the invention.

EXAMPLE I

In this example the preparation and pertinent properties of various phosphates employed as heavy oil demetallization catalysts are described.

CONTROL CATALYST

Mixed zirconium phosphate-nickel phosphate was prepared by dissolving 116.5 grams (0.5 mole) of $ZrOCl_2.4H_2O$ and 145 grams (0.5 mole) of $Ni(NO_3)_2.6H_2O$ in 1.5 liters of hot water. A solution of 150 grams of $(NH_4)_2HPO_4$ in 0.7 liter of warm water was added to the first solution (containing zirconyl chloride and nickel nitrate) with stirring for 30 minutes. The resulting mixture was filtered to obtain the precipitate. The zirconium phosphate-nickel phosphate ($Zr-Ni-PO_4$) filter cake was washed with 1 liter of warm water. The filter cake was then slurried in 2 liters of hot water, stirred for 1 hour, filtered and washed with 1 liter of hot water. The washed nickel phosphate-zirconium phosphate was dried for about 16 hours in a vacuum oven at 120° C. and calcined in air at 550°–580° C. for 4 hours. The surface area of the resulting catalyst was 56 $m^2$/grams, its pore volume (determined by mercury porosimetry) was 0.90 cc/gram, and the volume of pores having a diameter smaller than 300 Å (calculated from BET nitrogen adsorption) was 0.16 cc/gram. This catalyst was employed in runs 16 and 17.

A mixed zirconium phosphate-iron phosphate was prepared by disolving 43 grams of $Fe(NO_3)_3$ (Mallinckrodt Company; lot AAL) and 95 grams of $ZrO(NO_3)_2$ (Fisher Scientific Company; lot 700742) in 1 liter of hot water, filtering, then adding to the filtrate 100 grams of $(NH_4)_2HPO_4$ (Millinckrodt; lot WEMP-A) dissolved in 500 cc of water, mixing the two solutions and filtering them. The filtered precipitate was washed twice with about 2 liters of hot water and dried overnight at about 120° C. The surface area of the $Zr_3(PO_4)_4$-$FePO_4$ was 69.5 $m^2$/gram, its pore volume was 0.87 cc/gram, its bound Fe content was 6.8 weight-%, its bound Zr content was 27 weight-%, its bound P content was 19.9 weight-%, and its bound 0 content was 43.7 weight-%. This catalyst was employed in runs 1, 4, 7, 10, 13.

A mixed zirconium phosphate-cobalt phosphate was prepared by first dissolving 54 grams of $Co(NO_3)_2.6H_2O$ (Mallinckrodt; lot KPBZ) and 130 grams of $ZrOCl_2.4H_2O$ (Ventron Corporation, Alfa Division, Danvers, Mass., lot 040981) in 600 cc of deionized water at 57° C. with stirring, then adding to this solution 130 grams of $(NH_4)_2HPO_4$ dissolved 71° C. The mixture of in 500 cc of water, and stirring for 2 hours at 59°-71° C. The mixture of the two solutions plus dispersed $Zr_3(PO_4)_4$-$Co_3(PO_4)_2$ precipitate was filtered. The filter cake was slurried with 1 liter of water at 48° C., filtered, dried and calcined for 4 hours at 550° C. The pore volume of the dried zirconium phosphate-cobalt phosphate was 1.29 cc/gram. This catalyst was employed in runs 2, 5, 8, 11, 14.

INVENTICE CATALYST

The inventive mixed zirconium phosphate-iron phosphate-cobalt phosphate was prepared as follows. 87 grams (0.348 moles) of $ZrOCL_2.4H_2O$ were almost completely dissolved in 600 cc of deionized water by stirring at about 40° C. Then 30 grams (0.108 moles) of $FeSO_4.7H_2O$ (Mallinckrodt; lot KMEX) and 36 grams (0.124 moles) of $Co(NO_3)_3.6H_2O$ were mixed and added to the zirconyl chloride solution with stirring at about 66° C. A second solution, prepared by dissolving 100 grams of $(NH_4)_2HPO_4$ in 400 cc of deionized water at room temperature, was added to the first solution with rapid stirring at about 65° C. for about 15 minutes. The mixture of the two solutions plus dispersed zirconium phosphate-iron phosphate-cobalt phosphate was filtered. After washing with about 600 cc of deionized water, the filter cake was dried overnight and then calcined at about 500° C. for 4 hours. The calcined ternary phosphate was ground and screened through a 14/25 mesh screen. The surface area (determined by mercury porosimetry) of the coarse portion was 120 $m^2$/gram, its pore volume was 0.28 cc/gram, and its bulk density was 1.845 g/cc. This catalyst was employed in runs 3, 6, 9, 12, 15.

EXAMPLE II

This example illustrates the experimental setup for investigating the demetallization of heavy oils by employing various phosphate catalysts. Oil, with or without a dissolved decomposable molybdenum compound, was pumped by means of a LAPP Model 211 (General Electric Company) pump to a metallic mixing T-pipe where it was mixed with a controlled amount of hydrogen gas. The oil/hydrogen mixture was pumped downward through a stainless steel trickle bed reactor, 28.5 inches long and 0.75 inches in diameter, fitted inside with a 0.25 O.D. axial thermocouple well. The reactor was filled with a top layer (3.5 inches below the oil/$H_2$ feed inlet) of 50 cc of low surface area (less than 1 $m^2$/gram) α-alumina, a middle layer of 50 cc of a phosphate catalyst, and a bottom layer of 50 cc of α-alumina. The reactor tube was heated by a Thermcraft (Winston-Salem, N.C.) Model 211 3-zone furnace. The reactor temperature was usually measured in four locations along the reactor bed by a traveling thermocouple that was moved within the axial thermocouple well. The liquid product was collected in a receiver flask, filtered through a glass frit and analyzed, whereas exiting hydrogen gas was vented. Vanadium and nickel content in oil was determined by plasma emission analysis.

The feed was a mixture of 26 weight-% toluene and 74 weight-% Venezuelan Monagas pipeline oil having an API gravity of about 17–18. The hydrogen pressure was maintained at about 1000 psig in all experiments which generally lasted from about 2–6 hours. The reactor temperature (average of thermocouple readings at four reactor locations) was about 375°-435° C. The liquid hourly space velocity (LHSV) of the feed ranged from about 0.5 cc/cc catalyst/hour to about 1.5 cc/cc catalyst/hour.

EXAMPLE III

Results of heavy oil demetallization runs at 425° C. and 400° C. in accordance with the procedure described in Example II are summarized in Table I.

TABLE I

| | | | | | Feed | | | Product | | | |
|---|---|---|---|---|---|---|---|---|---|---|---|
| Run | Temp. (°C.) | LHSV (cc/cc/hr) | Catalyst | Run Time (Hrs) | Vanadium (ppm) | Nickel (ppm) | Total (V + Ni) (ppm) | Vanadium (ppm) | Nickel (ppm) | Total (V + Ni) (ppm) | Removal (V + Ni) (%) |
| 1 (Control) | 425 | 0.97 | Fe—Zr—PO$_4$ | 3 | 225 | 58 | 283 | 73 | 16 | 89 | 69 |
| 2 (Control) | 425 | 0.97 | Co—Zr—PO$_4$ | 3 | 243 | 53 | 296 | 29 | 18 | 47 | 84 |
| 3 (Invention) | 425 | 1.00 | Fe—Co—Zr—PO$_4$ | 3 | 243 | 56 | 299 | 47 | 22 | 69 | 77 |
| 4 (Control) | 425 | 1.52 | Fe—Zr—PO$_4$ | 2 | 225 | 58 | 283 | 96 | 23 | 119 | 58 |
| 5 (Control) | 425 | 1.47 | Co—Zr—PO$_4$ | 2.5 | 243 | 53 | 296 | 94 | 33 | 127 | 57 |
| 6 (Invention) | 425 | 1.29 | Fe—Co—Zr—PO$_4$ | 2 | 243 | 56 | 299 | 58 | 23 | 81 | 73 |
| 7 (Control) | 400 | 0.44 | Fe—Zr—PO$_4$ | 6.5 | 225 | 58 | 283 | 193 | 32 | 225 | 20 |
| 8 (Control) | 400 | 0.47 | Co—Zr—PO$_4$ | 6.5 | 243 | 53 | 296 | 79 | 31 | 110 | 63 |
| 9 (Invention) | 400 | 0.43 | Fe—Co—Zr—PO$_4$ | 6 | 243 | 56 | 299 | 28 | 16 | 44 | 85 |
| 10 (Control) | 400 | 0.97 | Fe—Zr—PO$_4$ | 3 | 225 | 58 | 283 | 222 | 36 | 258 | 9 |
| 11 (Control) | 400 | 0.94 | Co—Zr—PO$_4$ | 3 | 243 | 53 | 296 | 163 | 45 | 208 | 30 |
| 12 (Invention) | 400 | 1.04 | Fe—Co—Zr—PO$_4$ | 3 | 243 | 56 | 299 | 75 | 30 | 105 | 65 |
| 13 (Control) | 400 | 1.53 | Fe—Zr—PO$_4$ | 2 | 225 | 58 | 283 | 219 | 38 | 257 | 9 |
| 14 (Control) | 400 | 1.49 | Co—Zr—PO$_4$ | 2 | 243 | 53 | 296 | 141 | 37 | 178 | 40 |
| 15 (Invention) | 400 | 1.50 | Fe—Co—Zr—PO$_4$ | 2 | 243 | 56 | 299 | 113 | 41 | 154 | 48 |

Data in Table I show that the inventive ternary phosphate, coprecipitated iron phosphate-cobalt phosphate-zirconium phosphate, was generally more effective than the binary phosphates in removing nickel and vanadium from the heavy oil feed during hydrotreatment. Especially, at the economically more attractive lower temperature of about 400° C., a substantial demetallization advantage of the inventive ternary phosphate versus binary phosphates was realized.

Some sulfur was also removed by iron phosphate-cobalt phosphate-zirconium phosphate during the heavy oil hydrotreatment described in this example. At 425° C., about 33–47% of sulfur was removed; and at 400° C., sulfur removal was about 18–36%.

EXAMPLE IV.

In this example, the results of extended demetallization runs of up to 3 months in an automated reactor similar to the one described in Example II are described. Undiluted, heavy Monagas pipeline oil was used as the feed. It contained 88 ppm of Ni, 337 ppm of V, 2.73 weight-% S, 73.7 volume-% residual oil (boiling point higher than 650° F.), 24.7 volume-% of distillate (boiling range of 400°–650° .F); and it had an API gravity of 12.3°.

In all demetallization runs, the reactor temperature was 407° C. (765° F.), the oil feed LHSV was 0.9–1.1 cc/cc catalyst/hr, the total pressure was 2250 psig, and the hydrogen feed rate was 4800 SCF/bbl (standard cubic feet of $H_2$ per barrel of oil). Run 16 demonstrates the metal removal achieved with nickel-zirconium phosphate. Run 17 demonstrates the effect of adding $Mo(CO)_6$ as an additional demetallization agent to the feed oil. Results are summarized in Table II.

TABLE II

| Run | ppm Mo in Feed | Catalyst | Hours on Stream | Metals in Product (ppm) V | Ni | (V + Ni) | Removal of V + Ni (%) |
| --- | --- | --- | --- | --- | --- | --- | --- |
| 16 | 0 | Zr—Ni—PO$_4$ | 117 | 93 | 49 | 142 | 66 |
|  | 0 | Zr—Ni—PO$_4$ | 233 | 114 | 55 | 169 | 60 |
|  | 0 | Zr—Ni—PO$_4$ | 257 | 109 | 54 | 163 | 61 |
|  | 0 | Zr—Ni—PO$_4$ | 303 | 104 | 51 | 155 | 63 |
|  | 0 | Zr—Ni—PO$_4$ | 390 | 118 | 50 | 168 | 60 |
|  | 0 | Zr—Ni—PO$_4$ | 436 | 108 | 45 | 153 | 64 |
|  | 0 | Zr—Ni—PO$_4$ | 532 | 109 | 49 | 158 | 63 |
|  | 0 | Zr—Ni—PO$_4$ | 789 | 89 | 47 | 136 | 68 |
|  | 0 | Zr—Ni—PO$_4$ | 1008 | 118 | 42 | 160 | 62 |
|  | 0 | Zr—Ni—PO$_4$ | 1228 | 108 | 46 | 154 | 64 |
|  | 0 | Zr—Ni—PO$_4$ | 1416 | 110 | 42 | 152 | 64 |
|  | 0 | Zr—Ni—PO$_4$ | 1717 | 135 | 48 | 183 | 57 |
|  | 0 | Zr—Ni—PO$_4$ | 2189 | 135 | 49 | 184 | 57 |
| 17 | 70 | Zr—Ni—PO$_4$ | 124 | 90 | 40 | 130 | 69 |
|  | 70 | Zr—Ni—PO$_4$ | 220 | 92 | 42 | 134 | 68 |
|  | 70 | Zr—Ni—PO$_4$ | 244 | 68 | 36 | 104 | 75 |
|  | 70 | Zr—Ni—PO$_4$ | 327 | 78 | 38 | 116 | 73 |
|  | 70 | Zr—Ni—PO$_4$ | 375 | 81 | 37 | 118 | 72 |
|  | 70 | Zr—Ni—PO$_4$ | 423 | 74 | 36 | 110 | 74 |
|  | 70 | Zr—Ni—PO$_4$ | 471 | 68 | 35 | 103 | 76 |
|  | 70 | Zr—Ni—PO$_4$ | 495 | 64 | 34 | 98 | 77 |

Data in Table II show that the catalyst of this example, $Zr_3(PO_4)_4$-$Ni_3(PO_4)_2$, essentially retained its activity after about 2 months on stream. However, when the feed oil contained about 70 ppm of Mo (as dissolved $Mo(CO)_6$) the demetallization activity of the zirconium-nickel phosphate increased about 10% after almost 500 hours (3 weeks) on stream. The removal of V and Ni was consistently higher, especially after about 200 hours on stream, than without $Mo(CO)_6$. Substantially all iron (approximately 56 ppm in oil) was also removed with zirconium phosphate-nickel phosphate with and without added $Mo(CO)_6$. Based on these results, it is believed that the addition of molybdenum to the feed oil would also be beneficial when the inventive phosphate catalyst, iron phosphate-cobalt phosphate-zirconium phosphate, is used.

That which is claimed is:

1. A catalyst composition consisting essentially of zirconium phosphate, cobalt phosphate and iron phosphate.

2. A composition in accordance with claim 1 wherein said catalyst composition is a coprecipitated iron phosphate, cobalt phosphate and zirconium phosphate.

3. A composition in accordance with claim 1 wherein said catalyst composition has a surface area in the range of about 2 to about 400 m$^2$/gram and has a pore volume in the range of about 0.1 to about 4.0 cc/gram.

4. A composition in accordance with claim 3 wherein said catalyst composition has a surface area in the range of about 50 to about 150 m$^2$/gram and has a pore volume in the range of about 0.2 to about 1.0 cc/gram.

5. A composition in accordance with claim 2 wherein the molar ratio of said zirconium to the combination of said cobalt and said iron is in the range of about 10:1 to about 1:10 and wherein the molar ratio of iron to cobalt is in the range of about 10:1 to about 1:10.

6. A composition in accordance with claim 5 wherein the molar ratio of said zirconium to the combination of said cobalt and said iron is in the range of about 3:1 to about 1:1 and wherein the molar ratio of iron to cobalt is in the range of about 2:1 to about 1:2.

* * * * *